(12) United States Patent
Bristol et al.

(10) Patent No.: US 8,201,334 B2
(45) Date of Patent: Jun. 19, 2012

(54) ROLLER BEARING ASSEMBLIES AND ROLLER BEARING ASSEMBLY METHODS

(75) Inventors: Brent Bristol, Phoenix, AZ (US); Dori Marshall, Mesa, AZ (US); Craig M. Goodman, Chandler, AZ (US); Louie Timothy Gaines, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 466 days.

(21) Appl. No.: 12/411,260

(22) Filed: Mar. 25, 2009

(65) Prior Publication Data
US 2010/0247018 A1    Sep. 30, 2010

(51) Int. Cl.
*F16C 43/06*    (2006.01)
(52) U.S. Cl. .......... 29/898.04; 29/898.061; 29/898.064; 29/898.07; 29/447; 384/569
(58) Field of Classification Search ............ 29/898.04, 29/898.041, 898.06, 898.061, 898.064, 898.07, 29/405, 447; 384/569, 559, 560, 564, 565
See application file for complete search history.

(56) References Cited

U.S. PATENT DOCUMENTS

| | | | |
|---|---|---|---|
| 2,449,944 A | 9/1948 | Johnson | |
| 2,792,619 A | 5/1957 | Komm | |
| 5,086,560 A | 2/1992 | Glazier | |
| 5,421,088 A * | 6/1995 | Kawamura | ............... 29/898.062 |
| 2004/0158988 A1 * | 8/2004 | Ozawa et al. | ............ 29/898.061 |

FOREIGN PATENT DOCUMENTS
EP     1921333 A1    5/2008
* cited by examiner

*Primary Examiner* — David Bryant
*Assistant Examiner* — Christopher Besler
(74) *Attorney, Agent, or Firm* — Ingrassia Fisher & Lorenz, P.C.

(57) ABSTRACT

A roller bearing assembly includes an annular outer ring with first and second outer ring shoulders that define a first raceway in the outer ring. An annular inner ring may be disposed substantially concentrically within the outer ring, the inner ring including a base portion and first and second inner ring shoulders that extend from and are integral with the base portion to define a second raceway in the inner ring. A plurality of rolling elements may be arranged between the inner ring and outer ring and within the first and second raceways to rotatably couple the outer ring to the inner ring.

5 Claims, 4 Drawing Sheets

ROLLER BEARING ASSEMBLIES AND ROLLER BEARING ASSEMBLY METHODS

TECHNICAL FIELD

The present invention generally relates to roller bearing assemblies and roller bearing assembly methods, and more particularly relates to roller bearing assemblies and roller bearing assembly methods that are non-separable and full complement.

BACKGROUND

A rolling element bearing assembly carries a load by placing round elements between two members, such as inner and outer rings. The rolling movements of the rolling elements enable the two rings to rotate relative to one another with reduced resistance and sliding. Two types of assemblies are roller bearing assemblies and ball bearing assemblies. A roller bearing assembly uses cylinder-shaped rolling elements, while ball bearing assemblies use spherical-shaped rolling elements. In general, roller bearing assemblies have a higher radial load capacity as compared to ball bearing assemblies.

Design considerations for roller bearing assemblies include manufacture, assembly, installation, and operation. Assembly, in particular, may be difficult. A full complement of individual rolling elements must be arranged between the two rings. It is further advantageous if the assembled roller bearing assembly is non-separable to facilitate installation and operation. Conventionally, assembly of roller bearing assemblies required cages or other types of retention mechanisms and/or resulted in separable assemblies or assemblies that experienced undesirable issues.

Accordingly, it is desirable to provide an improved full-complement roller bearing assembly that is non-separable after assembly. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a roller bearing assembly includes an annular outer ring with first and second outer ring shoulders that define a first raceway in the outer ring. An annular inner ring may be disposed substantially concentrically within the outer ring, the inner ring including a base portion and first and second inner ring shoulders that extend from and are integral with the base portion to define a second raceway in the inner ring. A plurality of rolling elements may be arranged between the inner ring and outer ring and within the first and second raceways to rotatably couple the outer ring to the inner ring.

In accordance with another exemplary embodiment, a method is provided for assembling a roller bearing assembly. The assembly may include an outer ring with an outer raceway, an inner ring with an inner raceway, and a plurality of rolling elements for rotatably coupling the outer ring to the inner ring. The method may include comprising the steps of arranging the rolling elements within the outer raceway of the outer ring; heating the rolling elements and the outer ring so as to expand the outer raceway; and assembling the inner ring concentrically within the outer ring such that the rolling elements are arranged at least partially within the inner and outer raceways.

In accordance with another exemplary embodiment, a roller bearing assembly includes an annular outer ring with first and second outer ring shoulders that define a first raceway in the outer ring. An annular inner ring may be disposed substantially concentrically within the outer ring, the inner ring including a base portion and first and second inner ring shoulders that extend from and are integral with the base portion to define a second raceway in the inner ring. The first raceway may have a first width and the second raceway may have a second width that is greater than the first width. A plurality of rolling elements may be arranged between the inner ring and outer ring and within the first and second raceways to rotatably couple the outer ring to the inner ring. The first ring has a first axis, and the rolling elements have second axis that are substantially parallel to the first axis. The first and second inner ring shoulders may each have a height sufficient to clear the rolling elements during assembly and to maintain the rotatable coupling with the outer ring after assembly.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
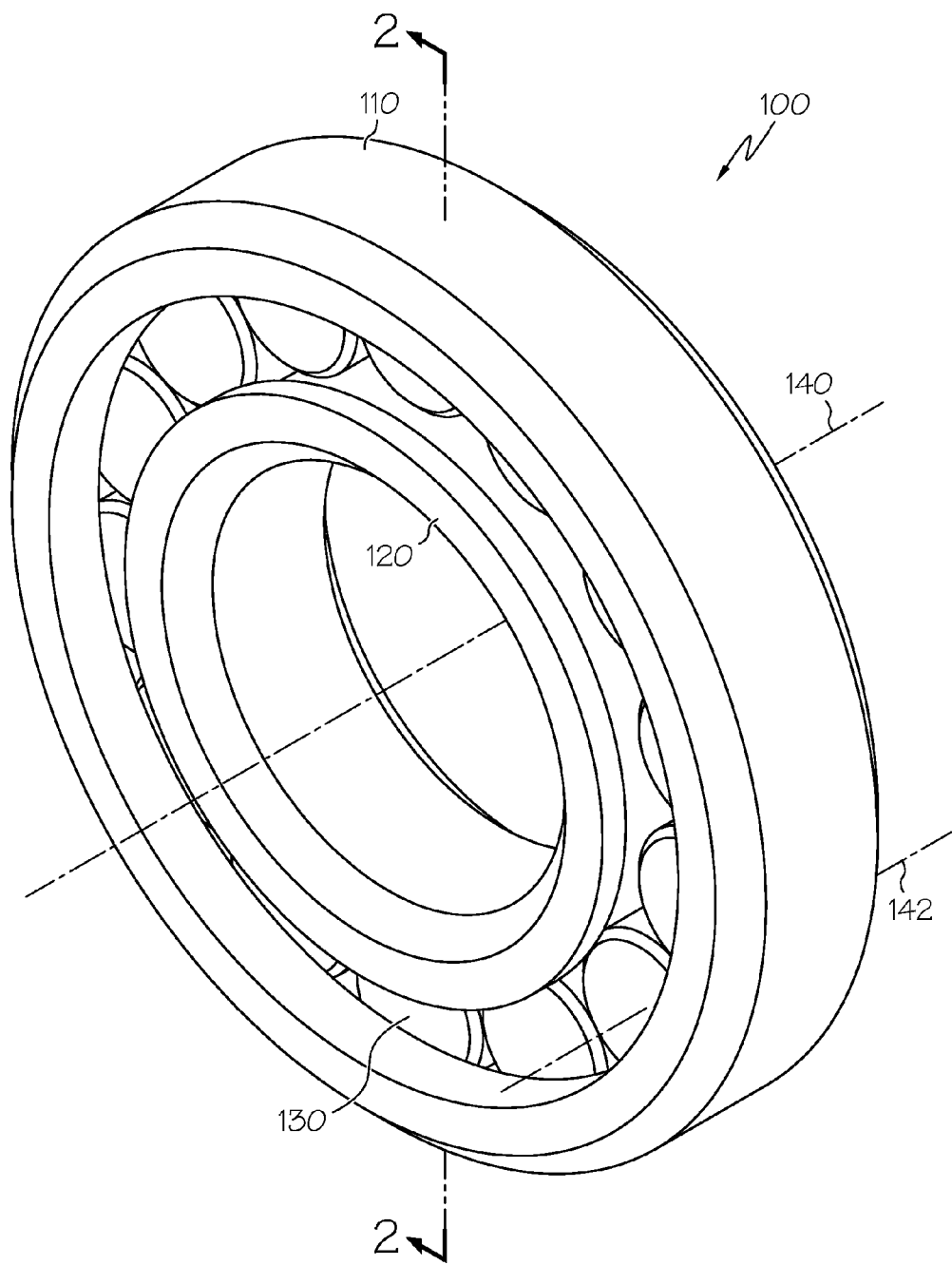
FIG. 1 is an isometric view of a roller bearing assembly in accordance with an exemplary embodiment.

FIG. 1 is an isometric view of a roller bearing assembly 100 in accordance with an exemplary embodiment. The roller bearing assembly 100 generally includes an annular outer ring 110 and an annular inner ring 120 arranged concentrically within the outer ring 110. A number of rolling elements 130 are arranged between the outer ring 110 and the inner ring 120 such that the outer ring 110 is rotatably coupled to the inner ring 120. In general, the inner ring 120 is mounted to a first member such as a shaft and the outer ring 110 is coupled to a second member such as a housing to enable relative rotational movement between the first and second members. In one exemplary embodiment, roller bearing assembly 100 may form part of a pneumatically actuated aircraft engine valve, and provides an enhanced load carrying capability in a relatively small possible package. Of course, other applications may also be provided. As noted below, in some exemplary embodiments, the roller bearing assembly 100 does not require spacers to maintain separation between the rolling elements 130 and/or a cage to retain the rolling elements within the outer and/or inner rings 110, 120.

The rolling elements 130 include a number of elements, which in one embodiment, is a full complement of rolling elements. That is, as many rolling elements as possible are respectively arranged between the outer and inner circumferences of the outer and inner rings 110, 120. The rolling elements 130 are generally cylindrical. In further embodiments, the rolling elements 130 can be ball bearings and/or needle bearings.

In general, the outer and inner rings 110, 120 share a first axis 140, and the rolling elements 130 each have an axis (e.g., axis 142) that is parallel to the first axis 140. As such, the roller bearing assembly 100 has non-tapered rolling elements 130. In one exemplary embodiment, each rolling element has a width of 6 mm and a diameter of 6 mm, although other dimensions may be used. In one exemplary embodiment, the roller bearing assembly 100 can be manufactured with steel.

Figure 2:
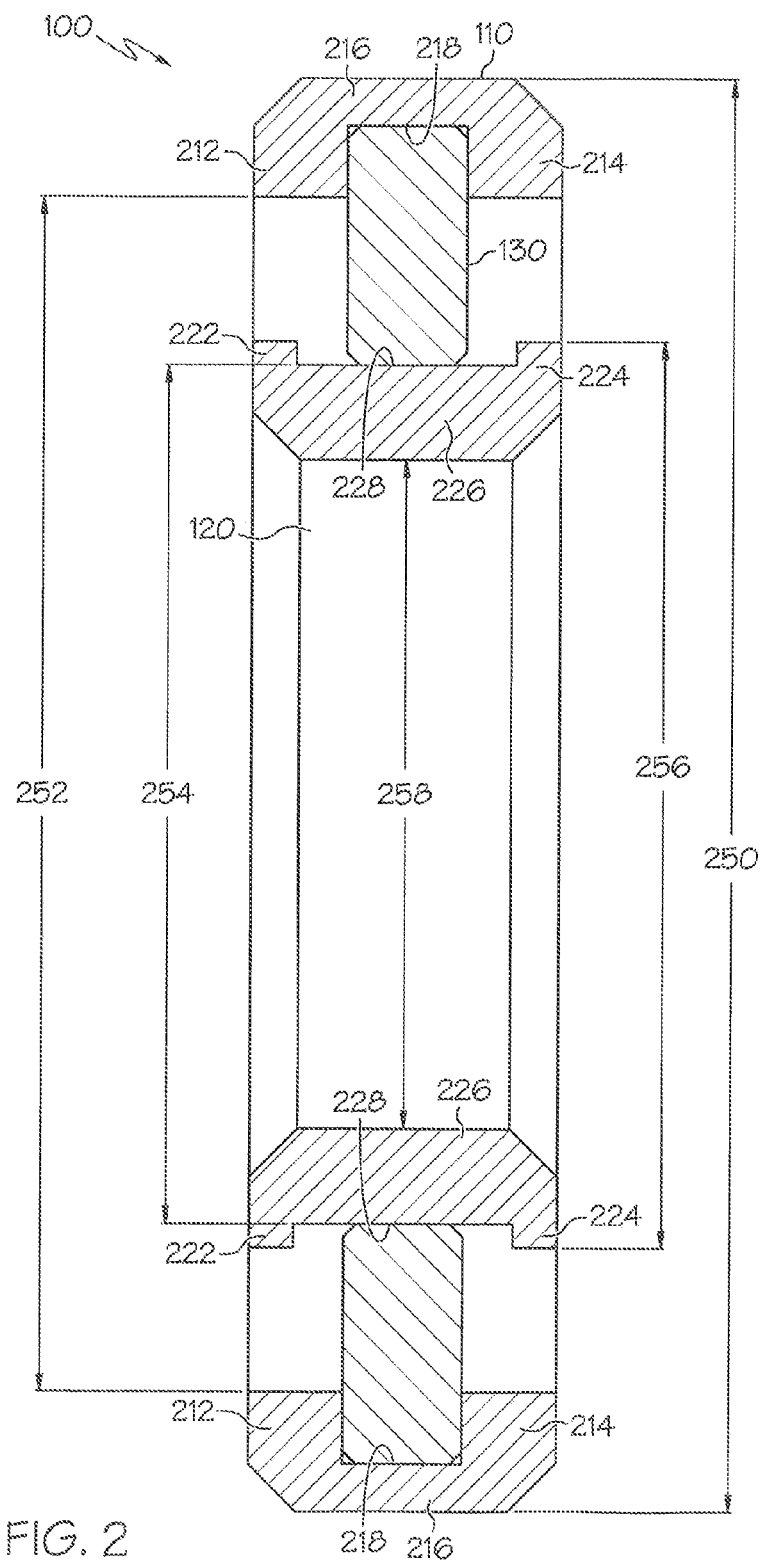
FIG. 2 is a cross-sectional view of the roller bearing assembly of FIG. 1 in accordance with an exemplary embodiment.

FIG. 2 is a cross-sectional view of the roller bearing assembly 100 of FIG. 1 in accordance with an exemplary embodiment. As best shown by FIG. 2, the outer ring 110 has two outer ring shoulders, which in this embodiment are guide shoulders 212, 214 on either side of a base portion 216. The guide shoulders 212, 214 and base portion 216 define a raceway 218 in the outer ring 110. The raceway 218 receives the rolling elements 130 and the guide shoulders 212, 214 guide the rolling elements 130 around the raceway 218 in the outer ring 110. The guide shoulders 212, 214 additionally function to retain the rolling elements 130 within the outer ring 110 of the roller bearing assembly 100. As shown in FIG. 2, the outer ring 110 has an outer diameter of 250 and an inner diameter of 252. Moreover, the outer ring 110 and rolling elements 130 together have an inner diameter of 254.

The inner ring 120 has two inner ring shoulders, which in this embodiment are snap shoulders 222, 224 on either side of a base portion 226. The snap shoulders 222, 224 and base portion 226 define a raceway 228 in the inner ring 120. The raceway 228 receives the rolling elements 130 such that the rolling elements 130 rotate around the inner ring 120. The snap shoulders 222, 224 additionally function to retain the rolling elements 130 within the outer ring 110 of the roller bearing assembly 100, if necessary, during installation and operation. As also shown in FIG. 2, the inner ring has an outer diameter of 256 and an inner diameter of 258.

Figure 3:
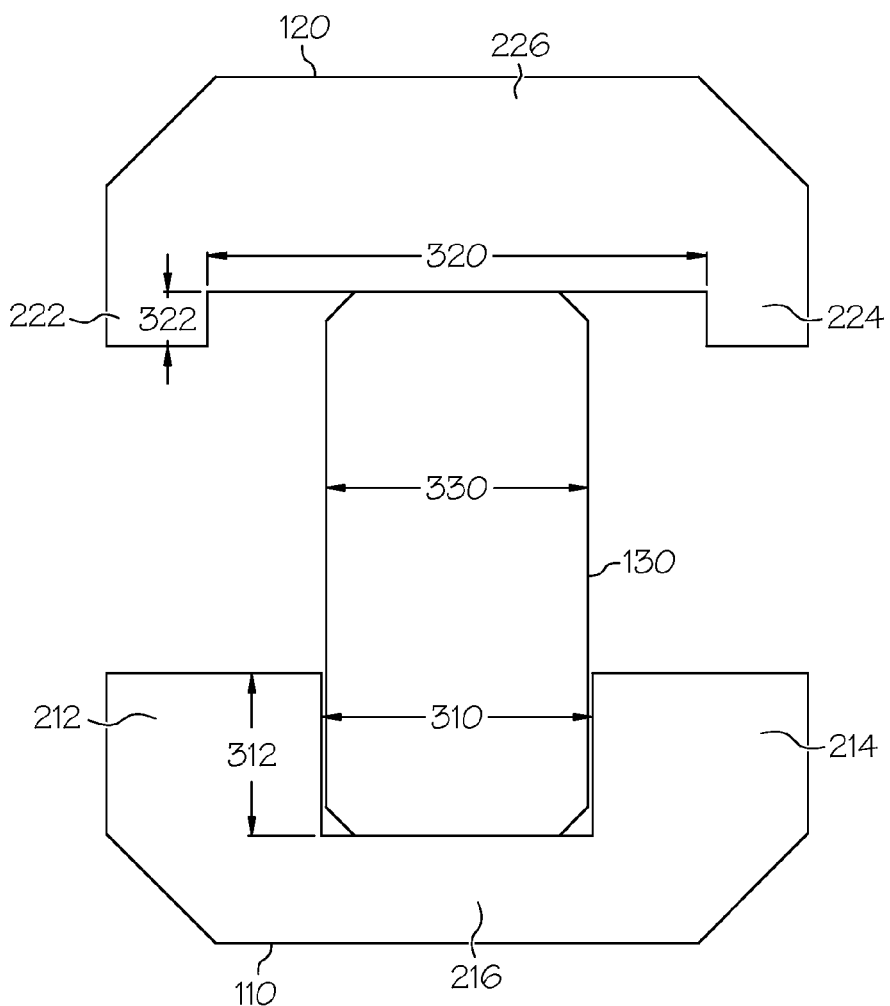
FIG. 3 is a close-up elevation view of a portion of the cross-sectional view of the roller bearing assembly of FIGS. 1 and 2 in accordance with an exemplary embodiment.

FIG. 3 is a close-up elevation view of a portion of the cross-sectional view of the roller bearing assembly 100 of FIGS. 1 and 2 in accordance with an exemplary embodiment. In particular, FIG. 3 illustrates the guide shoulders 212, 214 of the outer ring 110 and the snap shoulders 222, 224 of the inner ring 120.

In one exemplary embodiment, the guide shoulders 212, 214 are integral with base portion 216. That is, the guide shoulders 212, 214 are formed in one piece with the outer ring 210. The guide shoulders 212, 214 have a width 310 that is approximately equal to the width 330 of each rolling element 130 such that the guide shoulders 212, 214 function to guide the rolling elements 130 around the outer ring 110. In one exemplary embodiment, the height 312 of the guide shoulders 212, 214 are approximately 28% of the roller diameter, although other dimensions are possible.

In one exemplary embodiment, the snap shoulders 222, 224 are integral with base portion 226. That is, the snap shoulders 222, 224 are formed in one piece with the inner ring 120. The snap shoulders 222, 224 have a width 320 that is larger than the width 330 of each rolling element 130. In one exemplary embodiment, the snap shoulders 222, 224 have a width 320 that is approximately 144% of the width 330 of the roller element 130, although other dimensions are possible. As such, in one exemplary embodiment, the snap shoulders 222, 224 do not contact the rolling elements 130 during operation. If necessary, however, the snap shoulders 222, 224 retain the rolling elements 130 in an axial direction. Accordingly, the raceway 228 of the inner ring 120 is wider than the raceway 218 of the outer ring 110. As discussed in further detail below, in general, the snap shoulders 222, 224 have a height 322 sufficient to clear the rolling elements 130 during assembly and to maintain the rotatable coupling with the outer ring 110 after assembly. In general, this height 322 is less than a height 312 of the guide shoulders 212, 214. In one exemplary embodiment, the height 312 of the snap shoulders 222, 224 are approximately about 0.5% of the diameter of the rolling element 130. In other exemplary embodiments, the height 312 may be larger or smaller relative to the rolling element 130, depending on the application and manufacturing requirements.

Figure 4:
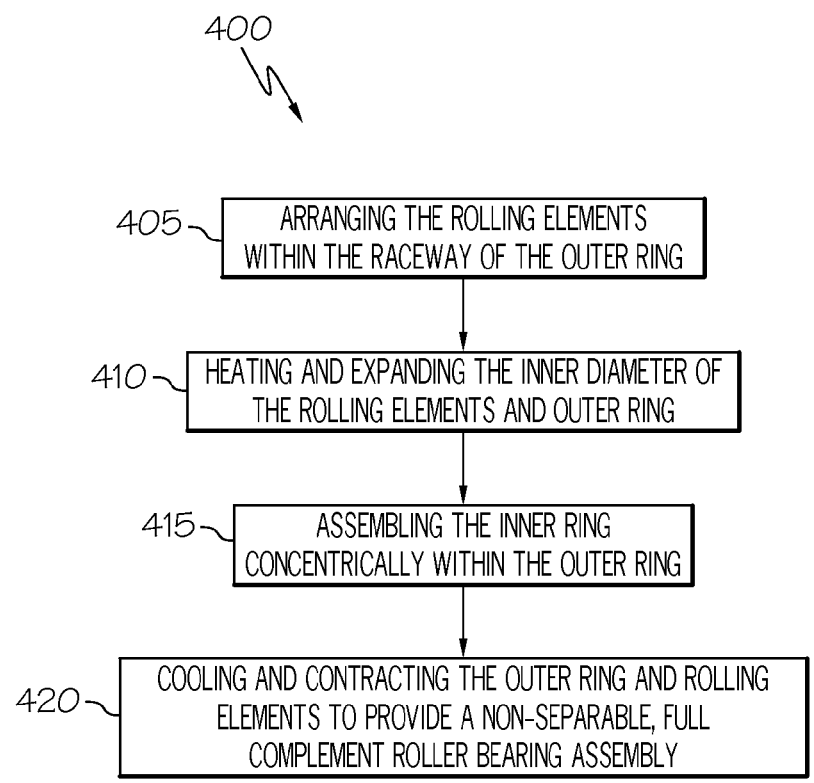
FIG. 4 is a method of assembling a roller bearing assembly in accordance with an exemplary embodiment.

FIG. 4 is a method 400 of assembling a roller bearing assembly, such as the roller bearing assembly 100 discussed above. As such, reference is additionally made to FIGS. 1-3. In a first step 405, the rolling elements 130 are assembled within the raceway 218 of the outer ring 110. The full complement of rolling elements 130 are installed within the raceway 218. At this stage, the bearing elements 130 may be held within the raceway 218 with a tool that enables retention of the bearing elements during some of the subsequent steps.

In a second step 410, the rolling elements 130 and outer ring 110 are heated so as to expand the inner diameter 254 of the rolling elements 130 and outer ring 110. As will be discussed below, the rolling elements 130 and outer ring 110 are heated such that the inner diameter 254 of the rolling elements 130 and outer ring 110 is greater than the outer diameter 258 of the inner ring 120. In one exemplary embodiment, the rolling elements 130 and outer ring 110 are heated to a temperature of approximately 300°, although other temperatures can be used.

In a third step 415, the inner ring 120 is assembled concentrically within the outer ring 110. Particularly, as noted above, the inner diameter 254 of the rolling elements 130 and outer ring 110 after the heating and expansion is greater than the outer diameter 258 of the inner ring 120 at room temperature. As such, the inner ring 120 may be inserted into the outer ring 110 and rolling elements 130 to form the roller bearing assembly 100. As noted above, the snap shoulders 222, 224 of the inner ring 120 have a height to facilitate this insertion. The height should be sufficient to retain the rolling elements 130 at room temperature, but relatively to small to enable assembly with the outer ring 110 and rolling elements 130.

Even if the inner diameter 254 of the rolling elements 130 and outer ring 110 after the heating and expansion is not greater than the outer diameter 258 of the inner ring 120 at room temperature, the snap shoulders 222, 224 may be forced or "snapped" over the rolling elements 130 to complete the roller bearing assembly 100.

In a fourth step 420, the roller bearing assembly 100, particularly the outer ring 110 and rolling elements 130, is allowed to cool and contract. After contraction, the rolling elements 130 are arranged at least partially within the raceway 228 of the inner ring 120. Alternatively, the roller bearing assembly 100 can be cooled, for example, by other mechanisms, such as liquid nitrogen. When the roller bearing assembly 100 is cooled, it provides a non-separable, full complement roller bearing assembly. In one exemplary embodiment, the roller bearing assembly 100 does not require additional retention components, such as separate retaining rings that can pop out or separate inner ring shoulders.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of assembling a roller bearing assembly, the assembly including an outer ring with an outer raceway, an inner ring with an inner raceway, and a plurality of rolling elements for rotatably coupling the outer ring to the inner ring, the method comprising the steps of:
    arranging the rolling elements within the outer raceway of the outer ring;
    heating the rolling elements and the outer ring so as to expand the outer raceway;
    assembling the inner ring concentrically within the outer ring such that the rolling elements are arranged at least partially within the inner and outer raceways,
    wherein the inner ring comprises snap shoulders, and wherein the assembling the inner ring step includes snapping the snap shoulders through the rolling elements;
    wherein the inner and outer rings are formed such that the inner raceway has a greater width than the outer raceway, and the inner raceway and the outer raceway are configured to receive a single row of elements.

2. The method of claim 1, further comprising cooling the outer ring and rolling elements to room temperature such that the outer raceway contracts and the assembly is non-separable.

3. The method of claim 1, wherein the inner ring has a first diameter, and wherein the heating step includes heating the rolling elements and the outer ring so as to expand the outer raceway to a second diameter greater than the first diameter.

4. The method of claim 1, wherein the arranging step includes arranging the inner ring with a first axis that is parallel to a second axis of each of the rolling elements.

5. The method of claim 1, forming the inner ring such that the inner raceway is integral with the snap shoulders.

* * * * *